Aug. 23, 1927.

W. F. PRIEST

ALARM GAUGE

Filed May 2, 1925

Inventor:
Walter F. Priest
by George A. Rockwell,
Atty.

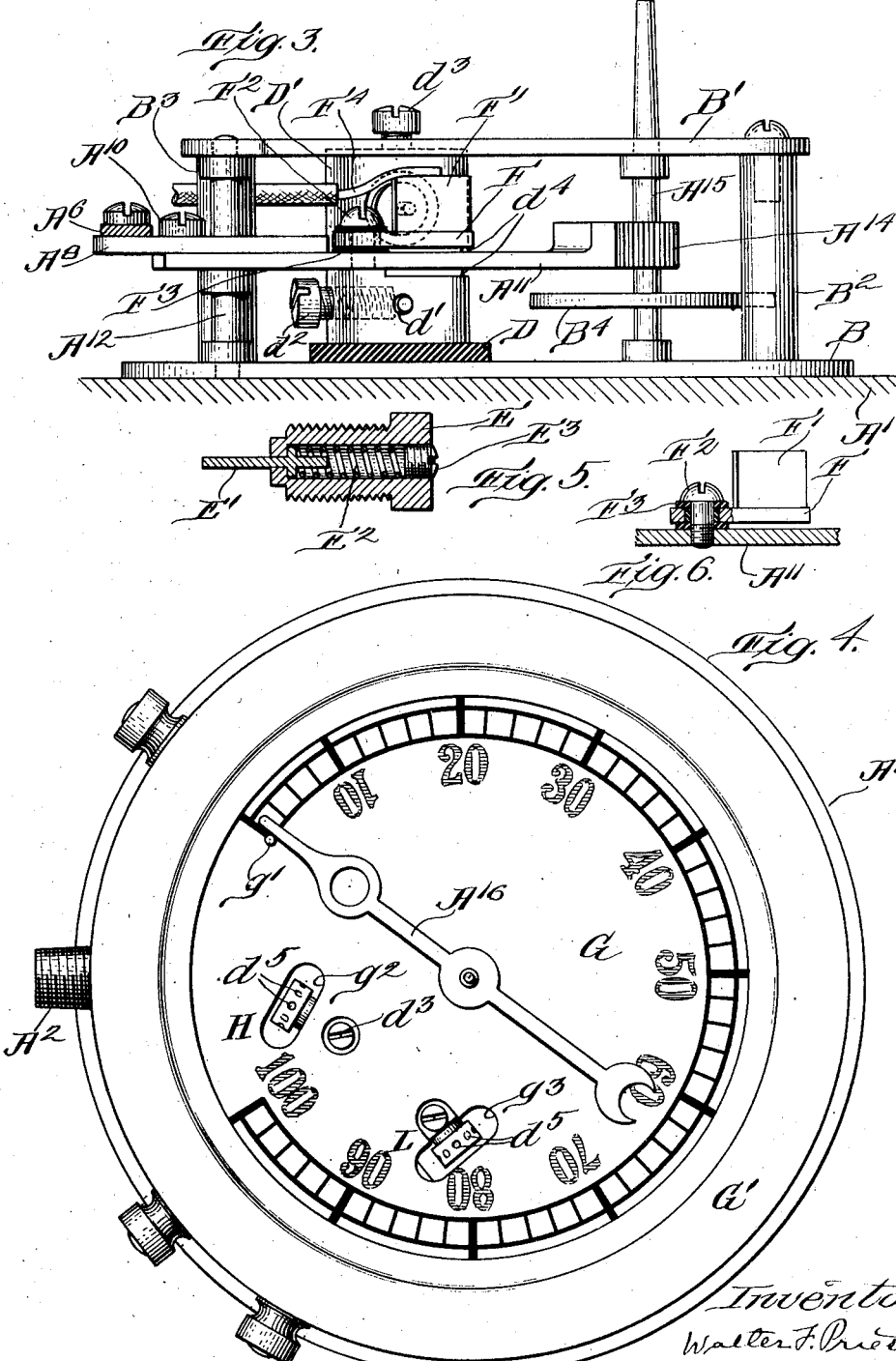
Aug. 23, 1927.
W. F. PRIEST
ALARM GAUGE
Filed May 2, 1925
1,639,965
2 Sheets-Sheet 2

Patented Aug. 23, 1927.

1,639,965

UNITED STATES PATENT OFFICE.

WALTER F. PRIEST, OF SOMERVILLE, MASSACHUSETTS, ASSIGNOR TO THE ASHTON VALVE COMPANY, OF CAMBRIDGE, MASSACHUSETTS, A CORPORATION OF MASSACHUSETTS.

ALARM GAUGE.

Application filed May 2, 1925. Serial No. 27,418.

The principal object of my invention is to make a simple and dependable gauge to give an alarm when the pressure is too high or too low. My gauge may be used with water, air, or steam or other material and is especially useful with sprinkler systems.

A feature of my invention is that it is adaptable to any pressure, vacuum or recording gauge.

Another feature is that an element of what is called the movement in gauges of said types carries the terminal which is to engage the high pressure terminal and also the low pressure terminal, and said element is preferably the sector, with the result of avoiding frictional load.

Another feature is that I provide adjustment of the alarm throughout the range of the dial, high or low or both, without interfering with the accuracy of the gauge or dismantling any of its parts.

Another feature is that after the alarm contact is made the gauge will continue to operate without interfering with its accuracy.

Another feature is that the gauge does not have to be retested after any change in setting the alarm.

Another feature is that the electrical terminals or contact points may continue to move after contact is made.

Still another feature is that all parts conducting the electric current are insulated from the movement and the case.

Other features will be pointed out below.

In the drawings—

Figure 3 is a partial sectional elevation on the line 3—3 of Figure 1;

Figure 4 is a plan of said gauge with all the parts in place; and

Figure 5 is an enlarged sectional detail of one of the terminal carriers; and

Figure 6 is a sectional detail described below.

Figures 1, 2:
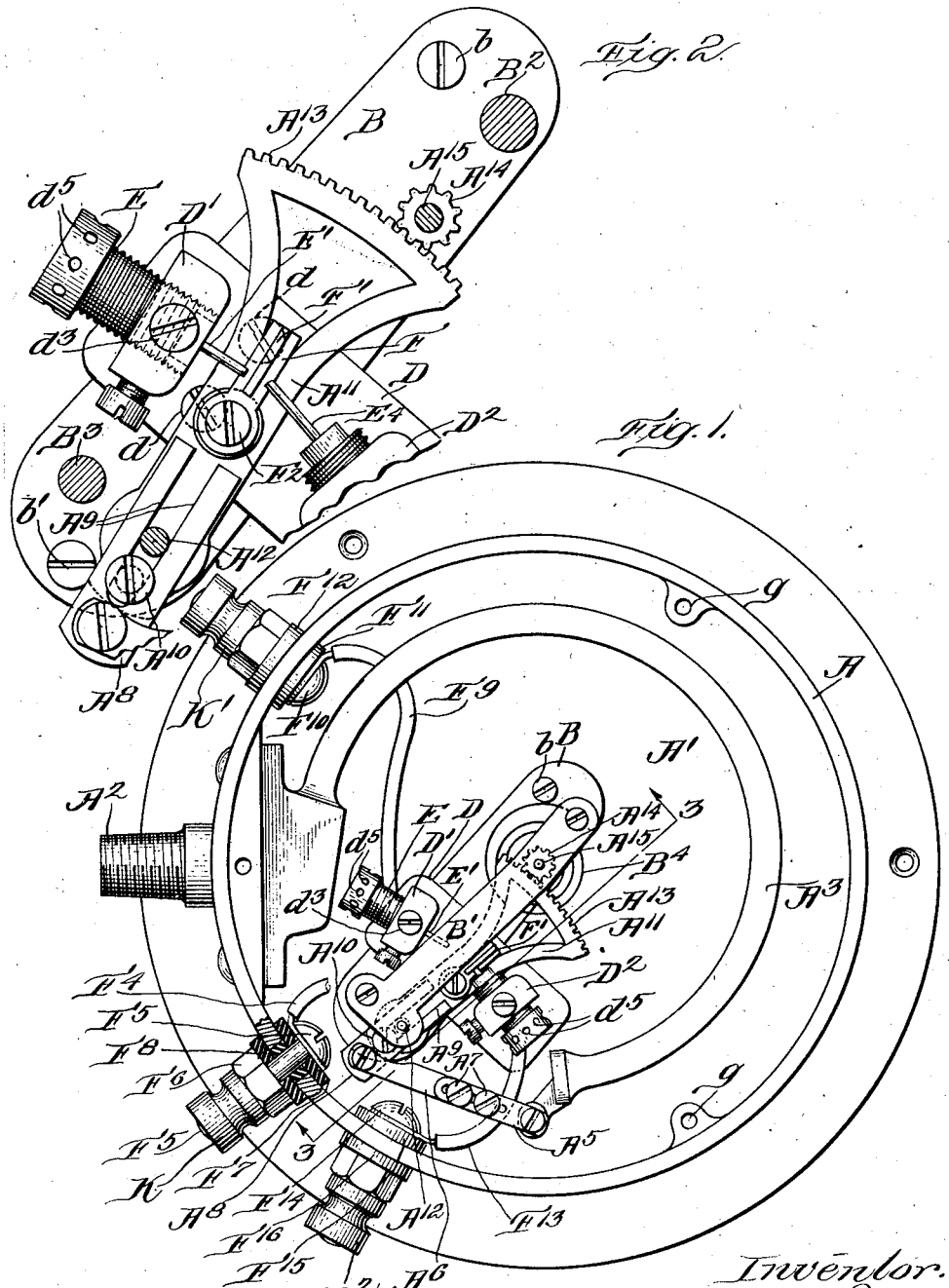
Figure 1 is a plan of a gauge embodying my invention, the dial and glass and cap being removed.
Figure 2 is an enlarged detail of the sector and adjacent parts described below.

I provide an ordinary metal gauge casing having wall A and base A′, the latter to be connected with a suitable support. An ordinary inlet $A^2$ leads to Bourdon tube spring $A^3$, which, at its movable end, is pivotally connected with a link which may be in two parts $A^5$ and $A^6$ so as to be adjustable, said parts being normally held together by screws $A^7$. Part $A^6$ of said link is pivotally connected with member $A^8$ slotted at $A^9$. Screw $A^{10}$, in the desired position of adjustment in slot $A^9$, rigidly connects member $A^9$ with sector $A^{11}$ at one side of the stud $A^{12}$ upon which stud the sector is fixed and with which it may oscillate, the sector having teeth $A^{13}$ meshing with pinion $A^{14}$ fixed to shaft $A^{15}$, the latter being in frictional engagement with the central perforation of pointer $A^{16}$ and oscillating the latter.

Plate B is held in place by screws $b$ and $b'$ and plate B′ is supported with relation to plate B by means of posts $B^2$ and $B^3$, these plates providing bearings for the stud or pivot $A^{12}$ with which the sector turns and for the shaft $A^{15}$ which turns the pointer.

A coiled spring $B^4$, connected at one end to post $B^2$ and at the other end to shaft $A^{15}$ tends to turn the latter so as to have the pointer point normally at zero.

Insulating plate D is screwed by screws $d$ to plate B and suitably supports metal brackets D′ and $D^2$, which are substantially alike and therefore description of one will suffice. Bracket D′ has a recess $d'$ to receive a wire; has a threaded recess to receive screw $d^2$, the latter holding the wire in place; has a threaded passage for the metal terminal carrier described below; has a threaded perforation at the top for set screw $d^3$ which is to hold said terminal carrier in adjusted position; and has a recess $d^4$ to permit desired swinging of the sector. The terminal carrier E has a perforation at one end through which extends the shank of the movable contact or terminal E′, the latter having a collar within the bore of member E which collar forms one abutment for coiled spring $E^2$, the other abutment being screw plug $E^3$, said spring tending to hold said collar in the position shown in Figure 5. A similar movable contact or terminal $E^4$ is similarly mounted in a carrier on bracket $D^2$. Both terminal carriers are provided with peripheral notches $d^5$ which may be engaged by any suitable tool so as to screw the carriers in or out to provide desired adjustment after releasing the set screw, as $d^3$.

Spaced slightly from the top of the sector is metal plate F having a vertical extension F′, this plate being adjustably fixed to the sector by screw F² and being insulated at F³.

Soldered to the top of extension F' is wire F⁴, leading to binding screw F⁵ held by nut F⁶, the head of the screw being insulated from the casing by insulation F⁷ and the nut being insulated from the casing by insulation F⁸. The wire F⁹ held in its recess by screw $d^2$ leads to binding screw F¹⁰ which is similarly insulated from the wall of the casing at F¹¹ and F¹². The wire F¹³ leads from bracket D² to binding screw F¹⁴ which is similarly insulated from the casing wall at F¹⁵ and F¹⁶.

Dial G is suitably connected to the lugs $g$ on the wall of the casing and is provided with a stop $g'$ and also slots $g^2$ and $g^3$ to give access to the peripheral notches $d^5$ and also with openings to give access to the set screws, such as $d^3$.

A glass may rest on the top of the wall of the casing and may be held in place by metal cap G'.

I also provide additional nuts K K' and K² to connect suitable lead wires to the binding screws F⁵, F¹⁰ and F¹⁴.

In using my gauge the movement of the Bourdon spring will move the sector and give the usual indication by means of the pointer. If the pressure becomes higher than desired terminal F' will be moved into engagement with terminal E' and make a circuit and give the alarm and if the pressure increases still further the two terminals F' and E' will continue to move in contact with each other and during this movement the pointer will continue accurate and dependable indication. Similarly if the pressure becomes too low terminal F' will engage terminal E⁴ and if the pressure becomes still lower the two terminals F' and E⁴ will continue to move in contact with each other. During these movements the spring E² in carrier E and the corresponding spring in the other terminal carrier will hold the respective terminals E' and E⁴ in firm electrical contact with terminal F'.

Adjustment of the springs, such as E², may be had by screwing up or unscrewing plug E³.

Adjustment of terminal carrier E may be had by removing the glass and cap G' and, without removing the dial, inserting a suitable tool through aperture $g^2$ to engage one of the notches and thereby turn the terminal carrier E. The other terminal carrier may be similarly turned by inserting a suitable tool through aperture $g^3$. Before turning the terminal carriers the set screw, such as $d^3$, should be unscrewed, and this is conveniently done by inserting a screw driver through the adjacent opening in the dial.

Screw F² (see Figure 6) is in threaded engagement with sector A¹¹ and is insulated from the plate F by insulating bushing F³.

The insulating pieces F⁷ and F⁸ are parts of a bushing which insulate the screw and parts carried thereby from the casing. The screws F¹⁰ and F¹⁴ are likewise insulated from the casing.

What I claim is:

1. A gauge of the character described comprising pressure indicating means including a sector; two longitudinally movable electric terminals; and a third electric terminal carried by said sector and movable to make contact with one of said two terminals to make a circuit to indicate that the pressure is too high and to make contact with the other of said two terminals to make a circuit to indicate that the pressure is too low.

2. A gauge of the character described comprising a Bourdon tube spring; two electric terminals movable substantially longitudinally; and a third electric terminal movable under the influence of said spring to make contact with one of said two terminals to make a circuit to indicate that the pressure is too high and to make contact with the other of said two terminals to make a circuit to indicate that the pressure is too low.

3. An alarm gauge comprising pressure indicating means including a sector; two longitudinally movable electric terminals; and a third electric terminal carried by said sector and movable to make contact with one of said two terminals to make a circuit and give an alarm when the pressure is too high and to move with said one terminal if the pressure increases further, thereby continuing the alarm, said third terminal being also movable to make contact with the other of said two terminals to make a circuit and give an alarm when the pressure is too low and to move with said other terminal if the pressure decreases further, thereby continuing the alarm.

4. A gauge of the character described comprising pressure indicating means including a sector; two longitudinally movable electric terminals; and a third electric terminal carried by said sector and movable to make contact with one of said two terminals to make a circuit to indicate that the pressure is too high and movable in contact with said one terminal if the pressure increases further, said third terminal being movable to make contact with the other of said two terminals to make a circuit to indicate that the pressure is too low and movable in contact with said other terminal if the pressure decreases further.

5. A gauge of the character described comprising pressure indicating means including a sector; two longitudinally movable electric terminals; and a third electric terminal carried by said sector and movable to make contact with one of said two terminals to make a circuit to indicate that the pressure is too high and movable in contact with said one terminal if the pressure increases further, said third terminal being movable to make contact with the other of said two terminals to make a circuit to indicate that the pressure is too low and movable in contact with said other terminal if the pressure decreases further, and resilient means to hold each of said two movable electric terminals in said movable contact with said third electric teminal.

6. In a device of the character described the combination of a bearing; a terminal carrier movably mounted on said bearing; and a dial having an opening located to give access to said carrier for adjustment thereof with relation to said bearing.

WALTER F. PRIEST.